United States Patent [19]

Romano

[11] 4,369,375

[45] Jan. 18, 1983

[54] POWER GENERATION FROM TIDAL CHANGES

[76] Inventor: Joseph Romano, 8 Cedar St., Montauk, N.Y. 11954

[21] Appl. No.: 252,386

[22] Filed: Apr. 9, 1981

[51] Int. Cl.³ .............................................. E02B 9/08
[52] U.S. Cl. ...................................... 290/53; 405/76; 417/333
[58] Field of Search .................. 290/42, 53; 60/495, 60/497, 501–503; 417/330–333; 405/76, 77

[56] References Cited

U.S. PATENT DOCUMENTS 3,426,540  2/1969  Fixel ...................................... 290/42
4,174,192  11/1979  Daddario ............................ 417/333

Primary Examiner—Ulysses Weldon
Assistant Examiner—Shelley Wade
Attorney, Agent, or Firm—Kenneth E. Macklin

[57] ABSTRACT

A system for generation of power from tidal changes which comprises: (A) two or more chambers positioned in proximity to tidally influenced water, each chamber being of a height greater than the maximum tidal height difference, each chamber being capable of being filled with water, and each chamber having a series of vertically arranged ports, each port being controlled by a valve, and (B) a turbine mounted on a float and positioned in such manner that an inlet for the turbine is capable of receiving water from the ports in sequence as the float rises or falls in response to tidal changes.

4 Claims, 4 Drawing Figures

POWER GENERATION FROM TIDAL CHANGES

The invention is concerned with the generation of power, particularly electric power, from changes in height of tidally influenced bodies of water. It is particularly concerned with a method for relatively constant power generation from the periodic rising and falling of tides.

BACKGROUND OF THE INVENTION

The potential power for the world in ocean tides and the difficulties that lie in attempting to achieve useful power from that potential are briefly noted in *Colliers Encyclopedia* (Macmillan, 1980). On page 349 of that reference, it is stated:

> Harnessing the energies of ocean tides has long exercised a fascination for the minds of men, and many schemes have been devised and tried in an effort to achieve this goal. But while it is theoretically possible that tidal power could supply upwards of one half of today's world electric power needs, and more power than stream power sources, practical limitations make it very unlikely that this theoretical potential will ever be realized.

The article goes on to state that the geographical site chosen should have a difference of at least 20 feet between high and low tides.

U.S. Pat. No. 1,333,444 states that "in tidal water power plants there is a period of about two hours when the plant cannot work effectively, this being substantially the change of tide". To overcome the problem that patent advocates using three tidal plants along a coast, each about 15 to 20 miles from the adjacent one in a generally north-south line in order to take advantage of the fact that "the time of tidal changes varies considerably with comparatively slight changes in latitude . . . ". Obviously, such a series of plants requires three costly separate installations.

U.S. Pat. Nos. 821,480 and 839,860 describe tide motors which have an upper and lower basin, the one in the former patent with a floating turbine and the one in the latter patent with stationary turbines which drive a dynamo to provide electric power.

U.S. Pat. No. 1,393,472 describes a tide motor comprising a floating barge having the motor mounted thereon, the motor having power-transmitting cogs which engage vertical rack bars anchored to the ocean floor. The rising or descending float causes the power transmitting cogs to be driven by engagement with the rack bars.

Still another tidal motor is described in U.S. Pat. No. 582,651. The tidal motor is mounted on a float with hollow flood and ebb tide sluice gates that may be floated or sunk as required by the tide so as to allow water to turn the turbine.

U.S. Pat. No. 545,241 shows the use of a stationary turbine and the use of a dammed bay which is divided into three lagoons. Valves channel water to and from the sea as required into the turbine so as to produce power.

SUMMARY OF THE INVENTION

The invention is concerned with a system for generation of power from tidal changes which comprises: (A) two or more chambers positioned in proximity to tidally influenced water, each chamber being of a height greater than the maximum tidal height difference, each chamber being capable of being filled with water, and each chamber having a series of vertically arranged ports, each port being controlled by a valve, and (B) a turbine mounted on a float and positioned in such manner that an inlet for the turbine is capable of receiving water from the ports in sequence as the float rises or falls in response to tidal changes.

DESCRIPTION OF THE PREFERRED EMBODIMENTS

Figure 1:
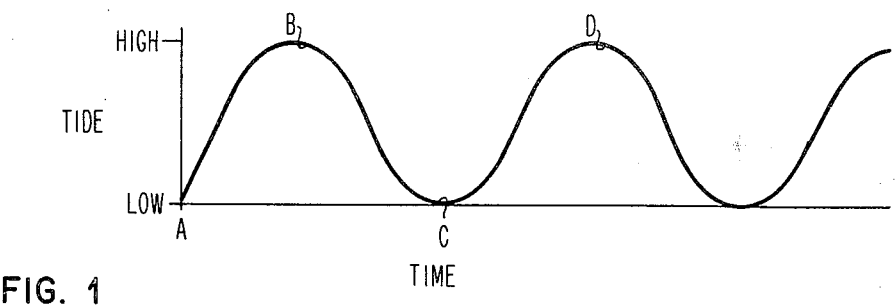
FIG. 1 is a graph showing the sinusoidal variation of the height of the tide with time.

As stated above, FIG. 1 shows the sinusoidal variation of tidal height with time. It will be noted that there is a positive rate of change or slope of the curve between points A and B. At the peak B, the rate of change is negligible. From point B to point C, there is a negative rate of change or slope of the curve. In the trough C of the curve, the rate of change is negligible. The cycle repeats itself from C to D and so on. With that visualization in mind, the operation of the preferred embodiment will become clear from the following description.

Figure 2:
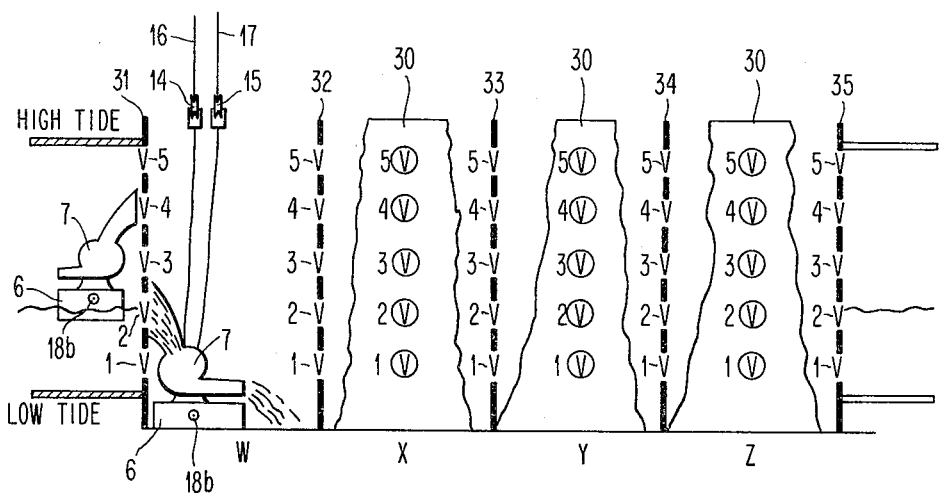
FIG. 2 is a view, partially in cross-section, of the chambers of one embodiment of the system.

FIG. 2 shows a system with four chambers, W, X, Y and Z. A lesser or greater number of chambers may be used instead. A minimum of two chambers should be used to achieve relatively constant power output. Generally, more chambers allow greater control of the constancy of power output. The chambers may be formed in natural coves or bays with appropriate constructed walls 30, 31, 32, 33, 34, 35, where required, made from suitable materials such as reinforced concrete. Alternatively, the chambers may be totally free-standing, with all walls constructed of suitable materials. Wall 30 is cut away in areas to show walls 31, 32, 33, 34 and 35. In the configuration shown, 1, 2, 3, 4 and 5 in each instance are ports with associated valves V in walls 30, 31, 32, 33, 34 and 35. The ports may be dual purpose, i.e., they may function as both inlets and outlets for water into and out of the chambers. Alternatively, there may be another row of such ports with associated valves alongside, but each spaced between the ports and valves in the rows depicted. In that case, one row of ports and valves could function as inlets and one row would function as outlets, or both rows could be dual function.

Figure 4:
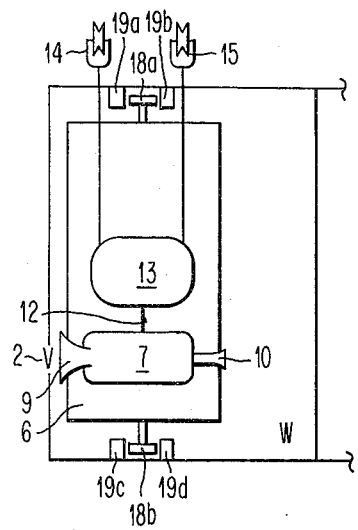
FIG. 4 is a top view of a chamber in the system showing the float, and the turbine and generator driven by the turbine, both of which are mounted on the float.
Figure 3:
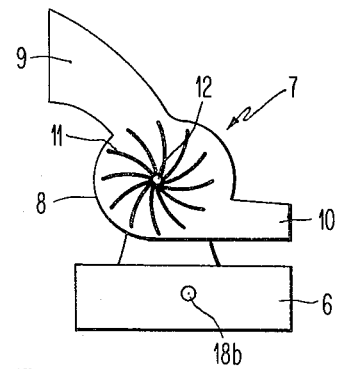
FIG. 3 is a cross-section view of a turbine on a float, one of which would freely float in each chamber of the system.

As shown in FIGS. 3 and 4, on float 6 is mounted turbine 7, which is comprised of housing 8 having inlet 9 and outlet 10. In the housing 8, vanes 11 are mounted on shaft 12, which protrudes through the housing 8 and drives generator or dynamo 13. Electric power generated by generator or dynamo 13 is conveyed where desired either by conventional cables (not shown) or by spring biased trolley poles 14 and 15, which respectively make contact with conductor rails 16 and 17. Pantographs may be used instead of trolley poles 14 and 15.

On float 6 at opposite sides are guide wheels 18a and 18b. Wheel 18a moves freely in the vertical channel between guide rails 19a and 19b, as does wheel 18b between guide rails 19c and 19d, as the float 6 moves up and down.

The system can be operated in many ways in order to produce relatively constant power. For example, all ports 1 to 5 would be closed. Then as the tide rises, port 2 in wall 31 in chamber W would be opened allowing water to drive turbine 7 and thereby generator or dynamo 13. As the tide causes the water in chamber W to rise and thereby float 6 to rise, port 2 in W would be closed and port 3 opened, and so on up the line of ports, all timed in sequence so as to have only one port open at a time, the particular one which at a particular float level directs water to inlet 9 of turbine 7. As high tide approaches, the same sequence would be conducted for chamber X through the ports in wall 30 at that chamber if the float 6, turbine 7 and generator 13 in that chamber (not depicted) are positioned in such a way that the inlet 9 for the turbine is behind wall 30 in chamber X in line with the ports in that section of the wall. (Alternatively, as high tide approaches the float 6, turbine 7 and generator 13 not depicted in chamber X (or in chambers Y and Z) may be positioned similar to those in chamber W and the water in chamber W may be allowed to drive the turbine 7 in chamber X in a manner similar to that described for chamber W.) Then as the tide beings to fall, the sequence is reversed so that valve 5 in Wall 31 is opened, causing the turbine 7 on the sea side of chamber W to turn. Next valve 4 is opened, and so on, all timed in sequence so as to have only one port open, the particular one which at a particular float level directs water to inlet 9 of turbine 7 on the seaside.

As low tide level is reached, the same sequence would be conducted from chamber X through ports 5 to 1 in the section of wall 30 for chamber X, for the optional turbine 7 on float 6 on the sea side of chamber X, which turbine and float are not depicted. Alternatively, water from chamber X can be directed into chamber W through port 1 in wall 32, which water can in turn drive the turbine 7 depicted on the sea side of chamber W as the water flows through the appropriate ports in wall 31.

The general operations described above can be duplicated or modified in optional chambers Y and Z, either in synchronization or out of synchronization with the operations just described.

Changes in height of tidal bodies of water are potential sources of mechanical power, and the mechanical power may be converted into electrical power. However, as a practical matter, such tidal changes have found very little use and account for minute percentages of the total amount of electric power which is generated.

The problem, of course, with the tidal changes is their periodicity which may be graphically represented as a sine wave curve, as shown in FIG. 1. With time, the tide rises from low tide A to high tide B, and then the tide falls from high tide B to low tide C. After that, it repeats, of course.

The periodicity of the rises and falls of the tide in a conventional system would result in periods of no power generation and in periods of variations in power.

However, in the system of the invention, it is possible to control power output so as to diminish or eliminate periods of no power generation or periods of variations in power generation. This is accomplished by use of the chambers and turbines in such a sequence and in synchronous or non-synchronous operation as to maintain essentially continuous power output with minimal variations. The control may be accomplished manually, but obviously that would require continual personnel attention. Control may be accomplished with an appropriate electromechanical system of relays and solenoid controlled valves. The preferred control, however, is accomplished with electronic computerized means. The computer or microprocessor can monitor tidal heights, power output, and operate the valves of the chamber ports so as to maintain essentially optimal, continuous power output.

Other optional components of the system to assist in maintaining constant power output are flywheels, electric storage batteries, pumped storage chambers, etc.

Modifications and changes in the foregoing may be made without departing from the scope of the invention.

What is claimed is:

1. A system for generation of power from tidal changes which comprises (A) two or more chambers, positioned in proximity to tidally influenced water, each chamber being of a height greater than the maximum tidal height difference, each chamber being capable of being filled with water, and each chamber having a series of vertically arranged ports, each port being controlled by a valve, and (B) a turbine mounted on a float and positioned in such manner that an inlet for the turbine is sequentially capable of receiving water from ports in sequence as the float rises or falls in response to tidal changes.

2. A system as claimed in claim 1 in which the operation of the valves and the overall system is monitored and controlled by electronic means.

3. A system as claimed in claim 1 in which computer means monitor tidal height and water flow and control the operation of the valves for the ports of the chambers so as to regulate the power output at a relatively constant level.

4. A system as claimed in claim 1 in which there are used to smooth the power output, means selected from the group consisting of fly wheels, electric storage batteries, and pumped storage of water.

* * * * *